May 28, 1968 — A. DANTINO ET AL — 3,385,452
STORE DISPLAY RACKS-SUPPLEMENTAL BEDS
Filed Feb. 11, 1966

INVENTORS
ANGELO DANTINO
DANIEL D'ANTIMO

INVENTORS
ANGELO DANTINO
DANIEL D'ANTIMO
BY
ATTORNEYS

May 28, 1968  A. DANTINO ET AL  3,385,452
STORE DISPLAY RACKS-SUPPLEMENTAL BEDS
Filed Feb. 11, 1966  5 Sheets-Sheet 3

INVENTORS
ANGELO DANTINO
DANIEL D'ANTIMO
BY

ATTORNEYS

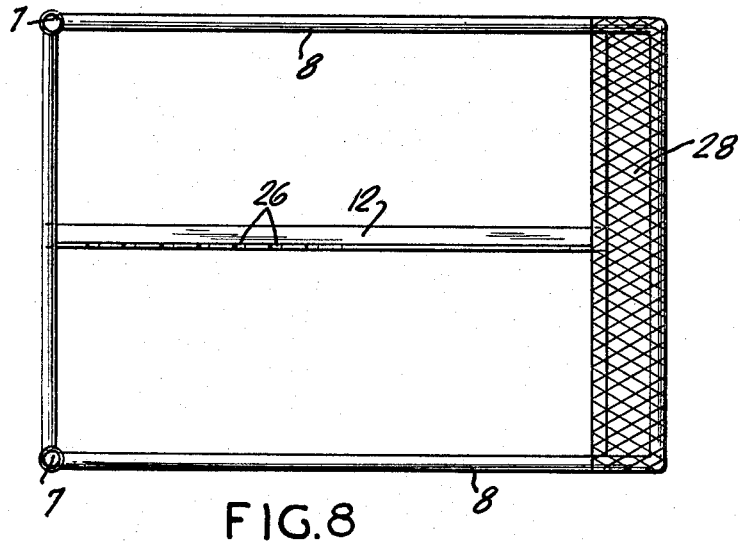
FIG.8
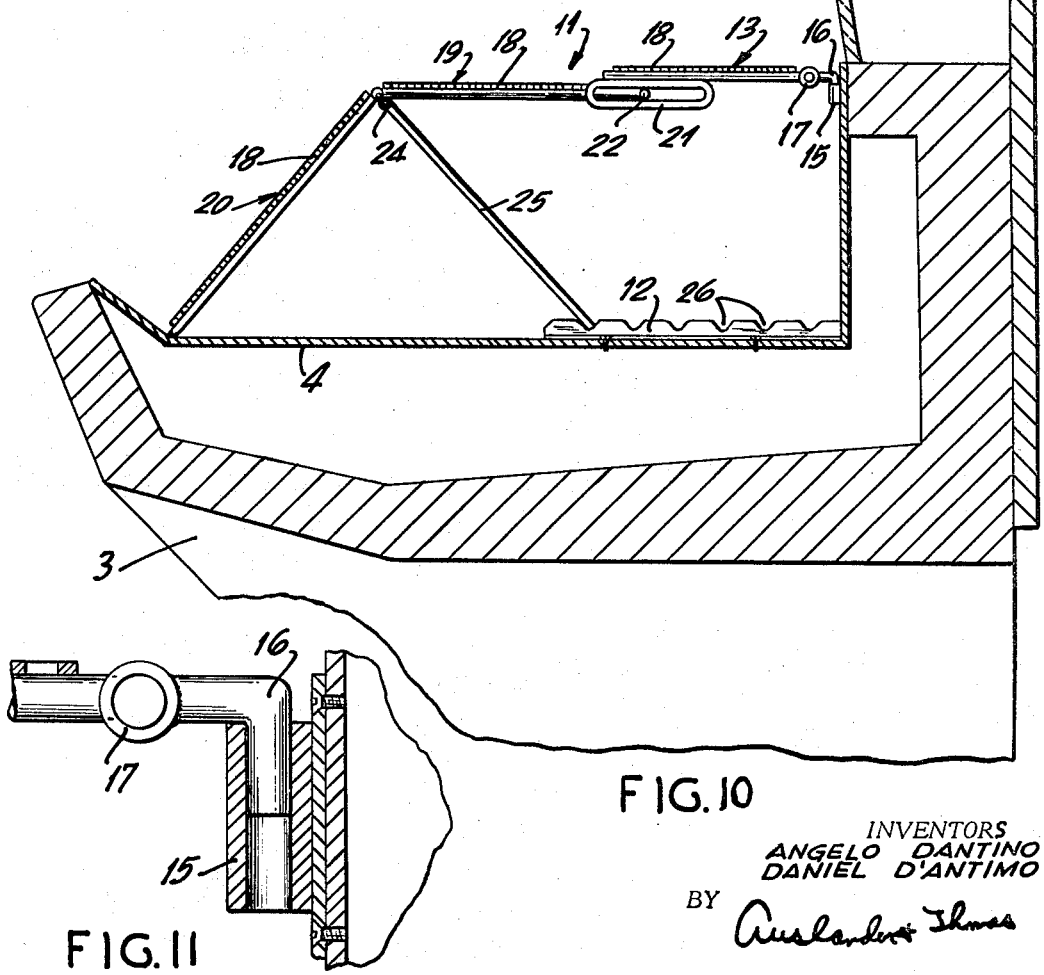
FIG.10
FIG.11
INVENTORS
ANGELO DANTINO
DANIEL D'ANTIMO
BY
ATTORNEYS.

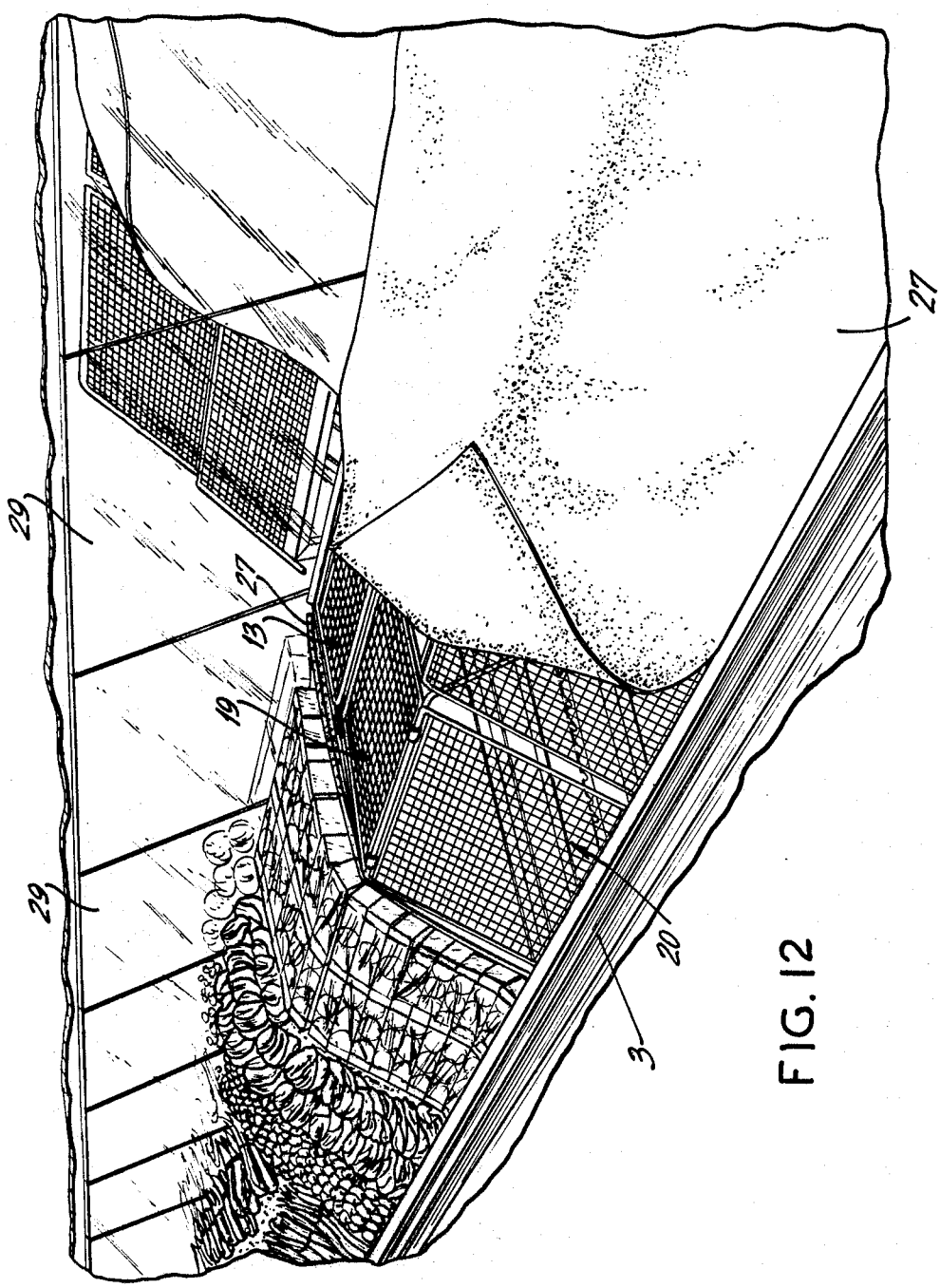

United States Patent Office 3,385,452
Patented May 28, 1968

3,385,452
STORE DISPLAY RACKS-SUPPLEMENTAL BEDS
Angelo Dantino, Cheektowaga, and Daniel D'Antimo, Stony Point, N.Y., assignors, by mesne assignments, to T. A. Buscaglia Equipment Co., Inc., Buffalo, N.Y.
Filed Feb. 11, 1966, Ser. No. 526,804
20 Claims. (Cl. 211—175)

ABSTRACT OF THE DISCLOSURE

A supplemental bed having a first platform rotatably mounted and a second platform having optional, slideable, or rotational engagement with the first. The first and second platforms are mounted in substantially uniplanar relation when overlapped and a third platform is rotatably engaged with the second. Support means are provided for maintaining the platforms fixed in relative position while permitting relative movement for varying the position thereof. The platforms can be mounted on a frame adapted to fit into a display rack, which frame can be broken down, or the supplemental bed can be mounted directly on the display rack.

---

The present invention relates to store display racks-supplemental beds, especially as adapted to food store use.

In the past in food stores, display racks have been provided with capacity for containing displays of food to meet both peak, normal and slow sales volume. It has been the practice to set up for the sales days in anticipation of the expected business volume.

It has been found that no matter what the volume of business, that full well displayed racks are most conductive to simulating the best customer interest and greatest purchase volume.

In the past, especially in anticipation of low sales volume days it has generally been the practice to stack display racks in such a manner as to give the appearance of being entirely full. Because of the labor of filling display racks and the likelihood of spoilage, especially of perishable items, it has been the practice where possible to avoid placing large quantities of goods on display racks in anticipation of low volume business.

Low anticipated business volume stacking is usually done to give the effect of "fulness." This is oftentimes achieved by finding some means of supplying underproppings of some sort, building up the pile of goods by forms of stacking to give the illusion of fullness.

Building up the pile of goods by stacking oftentimes requires painstaking labor and may either be unstable or may even tend to crush, spoil or misshape the underpropping items displayed, especially where vegetables or fruit are likely to be bruised or packages be crushed or misshapen. Bruised vegetables or fruit usually must be marked down in price as well as crushed or misshapen packages.

An alternative means of giving the display rack the necessary full appearance has been the use of fixed underproppings such as boxes which must be stored for such use or found among the cartons as best as possible, as the display racks are set up for the day. Such method is oftentimes awkward, indiscriminate or fettered by the need for finding the storage space for the boxlike underproppings and then bringing them from their place of storage to the display rack.

Especially in the display of vegetables and frozen foods, it is usually advantageous to make certain that selected temperatures are maintained and that air in general is allowed to freely circulate. Means of the past have been difficult to provide the complete combination of proper display without damage to the goods, and proper air circulation.

Custom and experience have usually dictated a covering over the display racks, usually such as a green mat, simulating grass, for vegetables. Such mats have also served to cover the awkward underproppings.

Frozen and perishable foods more than vegetables require good circulation of air. Where propping is used in such display racks, it has been found advisable not only to keep the underpinnings from view but to also provide for adequate circulation of air.

According to the present invention, a supplemental bed is provided for display racks which is adapted to adjust to give the appearance of fullness irrespective of the volume of goods stacked and which is further adapted to permit when required, necessary air circulation.

Although such novel feature or features believed to be characteristic of the invention are pointed out in the claims, the invention and the manner in which it may be carried out may be further understood by reference to the description following and the accompanying drawings.

FIG. 8 is a plan view of the base of the supplemental bed of FIG. 7.

FIG. 10 is a section view of another embodiment of the supplemental bed of the present invention in a display rack.

FIG. 11 is a detail of the platform mounting of FIG. 10.

FIG. 12 is a perspective view of the supplemental bed of the present invention showing a porous bed cover and stacked rack.

Referring now to the figures in greater detail, where like reference numbers denote like parts in the various figures.

The supplemental bed 1 of FIGS. 1–6 comprises a 90° bar frame 2 adapted to rest in a display rack 3 such as shown in FIG. 10. The supplemental bed 1 as an integral unit is adapted to rest on the display rack's 3 pan 4.

Figure 7:
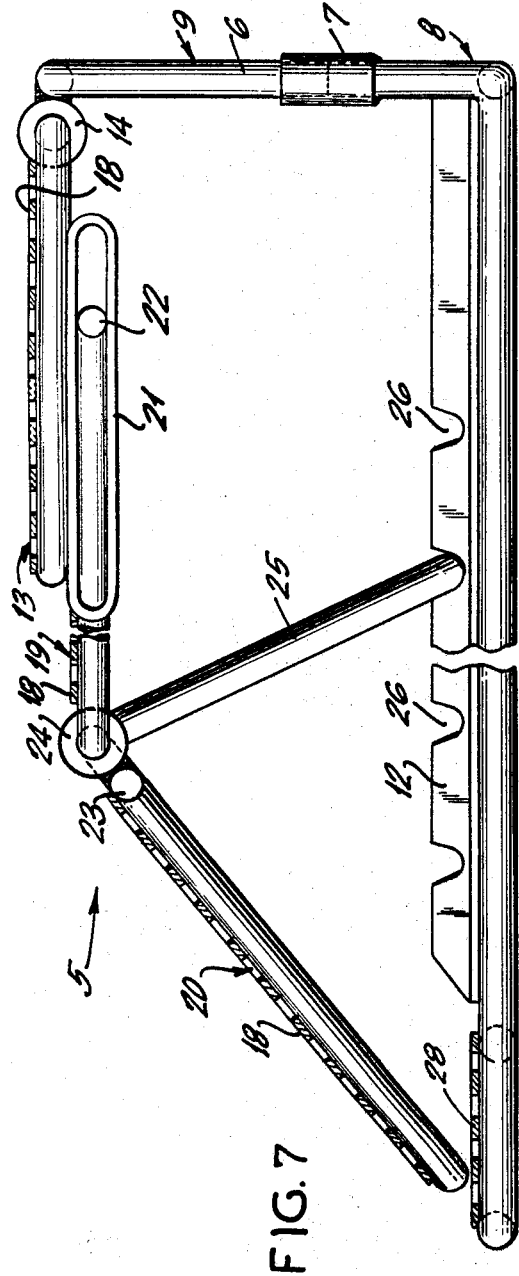
FIG. 7 is a section view of a supplemental bed of the present invention with a detachable rod frame construction.

The supplemental bed 5 as shown in FIG. 7 is similarly constructed with a rod frame 6 which may be broken down for convenience as indicated by the bushing 7 which in FIG. 7 is fixed to the lower section 8 of the rod frame 6 by conventional means such as welding. The bushing 7 is adapted to receive the upper section 9 to form the integral rod frame 6.

Figure 9:
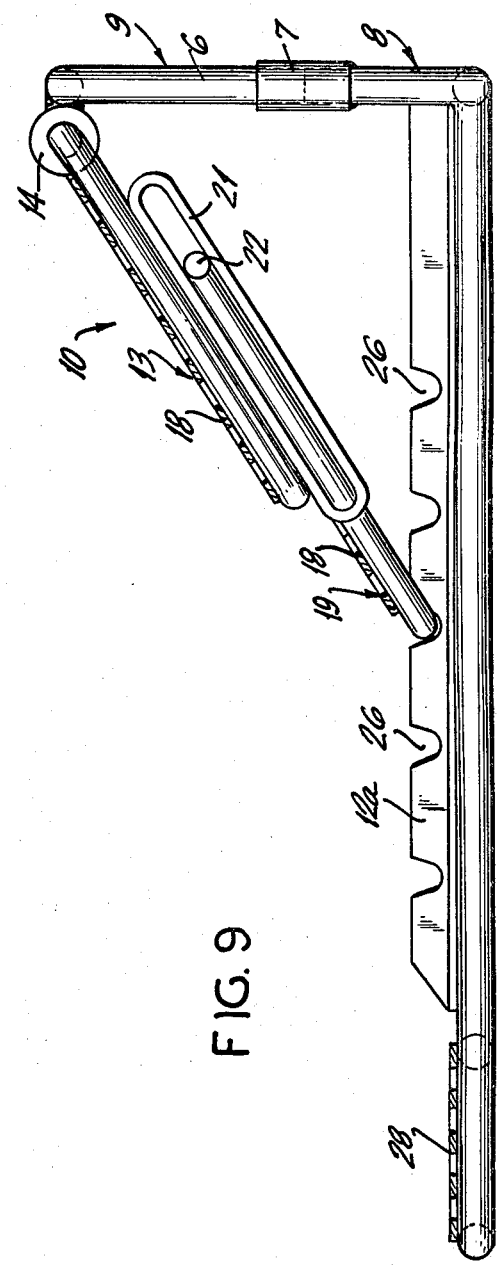
FIG. 9 is a section view of another embodiment of the present invention.

A modified supplemental bed 10 with a rod frame 6 is further shown in FIG. 9.

A frameless supplemental bed 11 is shown in FIG. 10 wherein the components are removably attached to the display rack 3 with the space bar 12 affixed to the display rack's 3 pan 4.

The various embodiments of the supplemental beds 1, 5, 10, 11 include a first platform 13 hingeably attached to the frames 2, 6, or the display rack 3.

As shown in FIGS. 1-9, the platform 13 is rotatably engaged in bushings 14 which may be welded to the frames 2, 6. The mounting of the bushing 14 is shown in detail in FIG. 3. An alternate mounting is shown in detail in FIG. 4.

The supplemental bed 11 of FIG. 10 is provided with a slot or bushing 15 affixed to the display rack 3 which is adapted to receive a mounting rod 16 to which the platform 13 is attached by way of a rotatable housing 17. The surface 18 of the platform 13 is preferably perforated or openwork, to provide for free circulation of air or may be constructed of rods across the platform or may be of expanded metal providing ventilation space.

The continuous platforms 19, 20 may also be provided with a perforated surface 18 for ventilation and circulation purposes.

As illustrated in the various embodiments, elongated slots 21 are mounted beneath the first platform 13 which protruded beyond the leading edge of the first platform 13 so that the contiguous platform 19 may be held in slideable uniplanar relationship with the first platform engaged by protruding rods 22. The platform 13, 19, slot 21 and rod 22 relationship permits an oversliding of the two platforms making the space relationship adjustable and stable with relation to each other since either downward or upward pressures on the platforms 13, 19 force the two platforms into flat engagement without much play.

Figure 1:
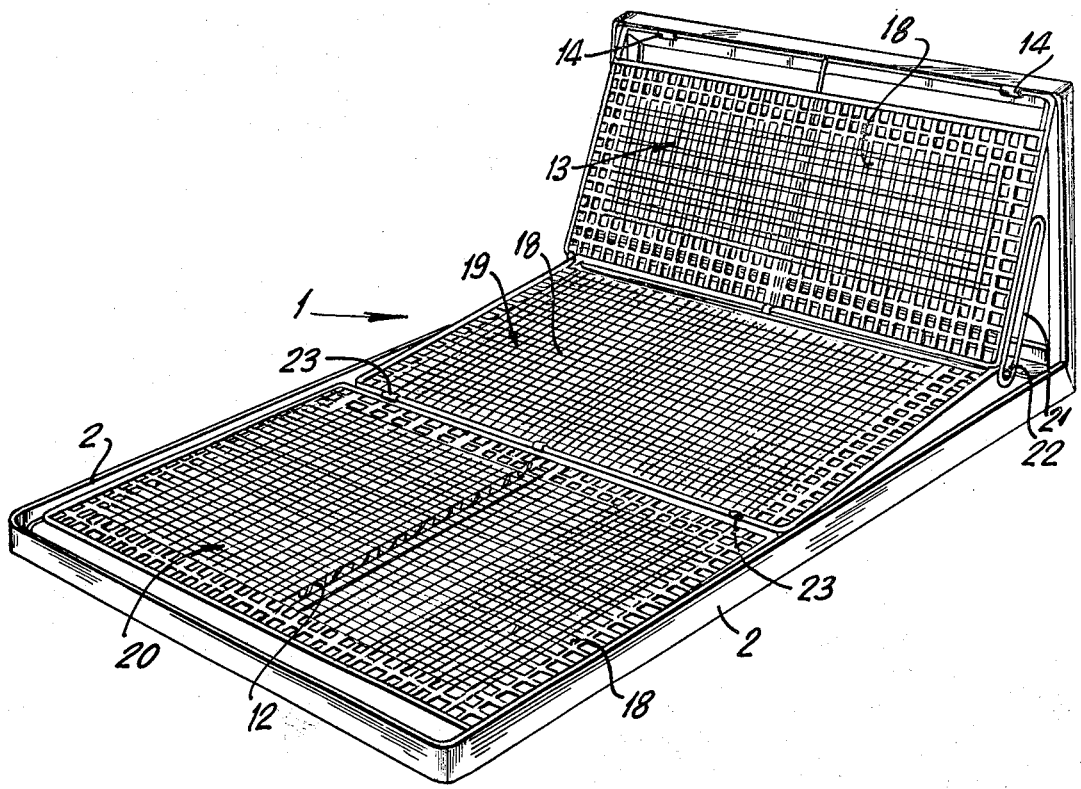
FIG. 1 is a perspective view of one form of display rack supplemental bed.
Figure 2:
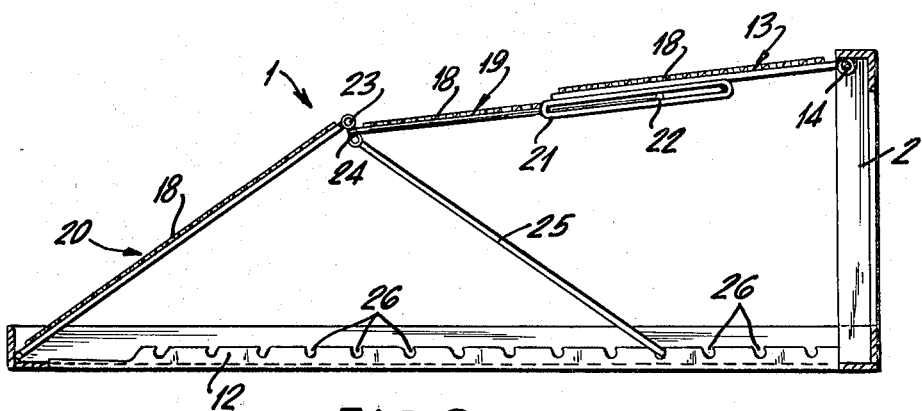
FIG. 2 is a section view of a side elevation of the supplemental bed of FIG. 1.
Figure 3:
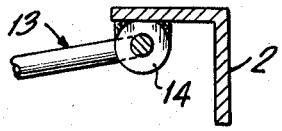
FIG. 3 is a detail of the frame and platform mounting of FIG. 2.
Figure 4:
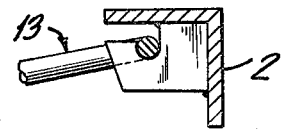
FIG. 4 is a detail of one alternate frame and platform mounting.
Figure 5:
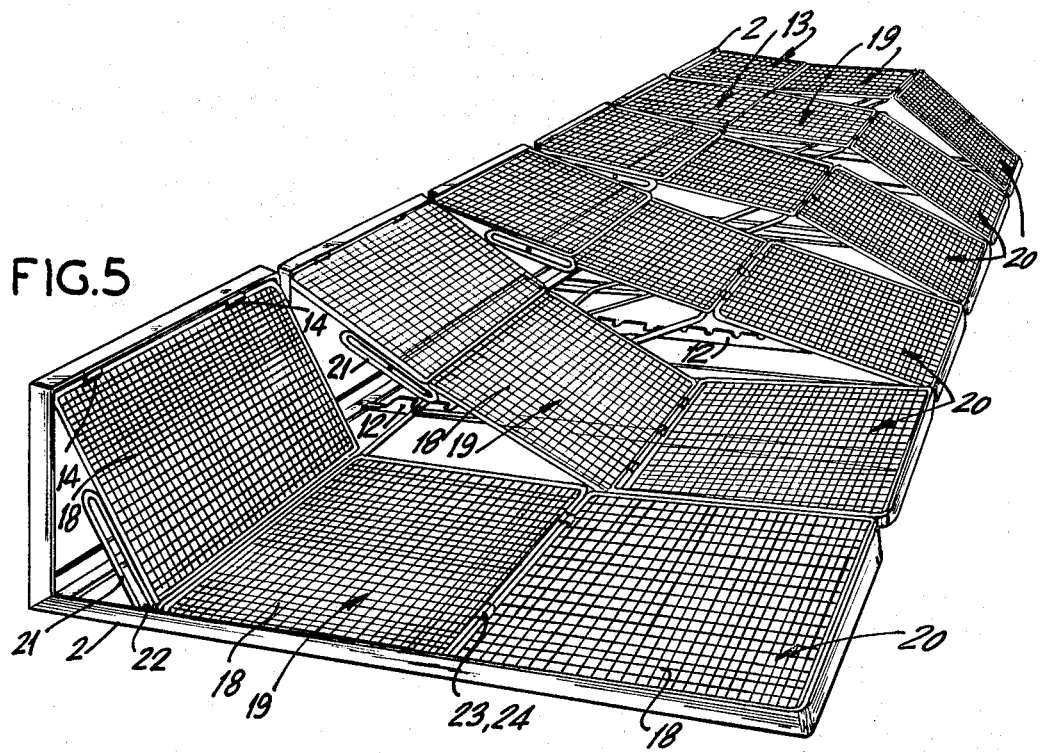
FIGS. 5 and 6 show various optional positions of the supplemental bed of the present invention.
Figure 6:
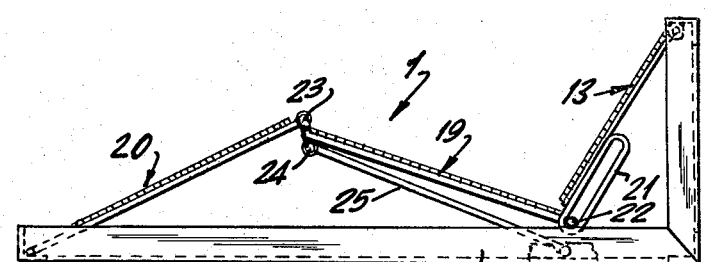

The ends of slots 21 protruding beyond the leading edge of the first platform, on the other hand act as bushings when in engagement with rods 22 permitting an independent rotation with regard to platforms 13, 19 allowing them to assume positions as between themselves as shown in FIGS. 1, 5 and 6.

It should be noted that essential to the overlap and rotation function of the platforms 13, 19 is the slot 21 and rod 22 relationship. Thus, while the slots 21 have been illustrated as below the first platform 13 and the engaging rods 22 appurtenant to the platform 19, any permutation and combination of rod and slot relationship as between platforms 13, 19 with the slots 21 either above or below the upper surface of the platform and the slot protruding beyond the edge of the platform will permit the combinations of positions illustrated. The drawings show the preferred embodiment.

Platforms 19, 20 are joined by bushing 23 which permit free rotation within the bushing 23 of the platforms. A further bushing 24 rotatably connects a support bar 25 which is engagable in the indentations 26 in the space bar 12.

The support bar 25 may be rotated to lie flush against the platform 20 to provide a flat bed relationship between platforms 19, 20 as shown in FIGS. 1 and 5.

Adjustment of the platforms 13, 19, 20, the rods 22 in the platform 19 and the support bar 25 in the indentations 26 in the space bar 12 permit the supplemental beds 1, 5, 11 to assume configurations for displaying as shown in FIGS. 5 and 6.

In FIG. 12 a plurality of supplemental beds are shown stacked with vegetables with the rack covered by porous covering 27 as shown folded back.

The porous covering 27 obscures the rack beneath the supplemental beds enhancing the illusion of fullness while maintaining air permeability. The porosity of the covering also permits the advantageous circulation of air for freshness or cooling and further serves to protect the stacked articles from shock in stacking or in the general handling received during a marketing day. It is generally advisable for the covering 27 selected to have sufficient pores to meet the needs of air to be circulated and be soft enough to supply the cushioning needs of the goods to be stacked.

The lower section 8 of the supplemental beds as shown in FIGS. 7 and 8 may have an expanded metal or perforated forward portion 28 beyond the space bar 12, 12a portion in aid of circulation, serving also to conceal the space bar 12, 12a which does not have to extend the full length of the lower section for support purposes.

In FIG. 9 the supplemental bed 10 comprises only platforms 13, 19 for use in more limited areas.

As shown in FIGS. 10 and 12, the display rack 3 is usually provided with a mirror which has served to not only give a better view of the displayed goods, but has in the past served part of the function of adding to the appearance of the fullness of the display rack 3 as stacked. The greatest advantage of the mirror's 29 effect is achieved with the present invention and the present invention avoids the mirror 29 showing a sparse display rack 3.

In use in anticipation of the day's volume of business and the type of product to be vended, the supplemental bed shape may be selected to accommodate the desired volume of goods to be stacked. Intra-day adjustments may also be made as large stacks are diminished by the day's sales or changes can be made at any time to accommodate the day's business needs.

The terms and expressions which are employed are used as terms of description; it is recognized, though, that various modifications are possible within the scope of the invention claimed.

Having thus described certain forms of the invention in some detail, what is claimed is:

1. A supplemental bed for a display rack comprising a first platform, means rotatably mounting said first platform to a display rack, a second platform, means engaging said first and second platforms in optional slideable or rotational engagement, said engagement means being adapted to maintain said platforms in uniplanar relationship while in overlapping engagement, and to provide rotational engagement of said platforms when not in overlapping engagement and means for engaging said first and second platforms and maintaining them in a fixed position.

2. A supplemental bed for a display rack comprising a first platform, means rotatably mounting said first platform to a display rack, a second platform, means engaging said first and second platforms in optional slideable or rotational engagement, said engagement means being adapted to maintain said platforms in uniplanar relationship while in overlapping engagement, said engagement means further protruding beyond the edge of at least one of said platforms to provide rotational engagement of said platforms when not in overlapping position, and means for engaging said first and second platforms and maintaining them in a fixed position.

3. A supplemental bed for a display rack comprising a first platform, means rotatably mounting said first platform to a display rack, a second platform, means engaging said first and second platforms in optical slideable or rotational engagement, said engagement means being adapted to maintain said platforms in uniplanar relationship while in overlapping engagement, said engagement means further protruding beyond the edge of at least one of said platforms to provide rotational engagement of said platforms when not in overlapping position, a further platform rotatably engaged with said second platform, support means adapted to support said platforms in optional positions, and means for engaging said support means and maintaining said platforms in a fixed position.

4. The invention of claim 3 wherein said support engaging means has a plurality of spaced indentations.

5. A supplemental bed as set forth in claim 4, wherein said support engaging means are affixed to the pan of a display rack.

6. The invention of claim 3 wherein each platform has an openwork surface.

7. The invention of claim 6 in combination with an air permeable porous covering.

8. The invention of claim 3 wherein the mounting means between said first and second platform comprises a combination of slots connected to one platform and rods extending from the other of said platforms engaged in said slots.

9. The invention of claim 3 wherein said platform support means is rotatably attached in the vicinity of the juncture of the said second and further platforms.

10. The invention of claim 9 wherein said support means is adapted to lie parallel with said further platform.

11. The invention of claim 3 wherein said first platform is attached to a bushing attached to a display rack.

12. The invention of claim 11 wherein said support engaging means is fixed to the pin of a display rack.

13. A supplemental bed for a display rack comprising a frame adapted to fit a display rack, a first platform, means rotatably mounting said first platform to said frame, a second platform, means engaging said first and second platforms in optional slideable or rotational engagement, said engagement means being adapted to maintain said platforms in uniplanar relationship while in overlapping engagement and to provide rotational engagement of said platforms when not in overlapping engagement, a further platform rotatably engaged with said second platform, support means adapted to support said platforms in optional positions, and means associated with said frame for engaging said support means and maintaining said platforms in a fixed position, said frame comprising a plurality of separable sections and means for engaging said frame sections in assembled relation.

14. The invention of claim 13 wherein the base of said frame has a forward portion with an openwork surface.

15. The invention of claim 13 wherein the first platform is detachably mounted to said frame.

16. A supplemental bed as set forth in claim 13, wherein said frame section engaging means comprise bushings fixed to one of said sections and adapted to receive another thereof.

17. A supplemental bed as set forth in claim 13, wherein said frame comprises an upper section and a lower section, said first platform being rotatably mounted on said upper section, and said support engaging means comprising part of said lower section.

18. A supplemental bed as in claim 13, together with an air permeable covering of cushioning material.

19. A supplemental bed as set forth in claim 18, wherein said support means includes a support bar rotatably connected to one of said second and further platforms adjacent the juncture thereof, and wherein said support engaging means provide multiple indentations for engaging said bar, said lower frame section having a portion forwardly of said support engaging means provided with an openwork surface, and the end of said further platform remote from said first platform bearing on said surface.

20. A supplemental bed for a display rack comprising a frame adapted to fit a display rack, a first platform, means rotatably mounting said first platform adjacent one end thereof to said frame, a second platform, means engaging said first and second platforms in optional slideable or rotational engagement, said engagement means being adapted to maintain said platforms in uniplanar relationship while in overlapping engagement and to provide rotational engagement of said platforms when not in overlapping engagement, and means on said frame providing multiple indentations for engaging the end of said second platform remote from said first platform and maintaining said platforms in fixed position.

References Cited

UNITED STATES PATENTS

| 1,848,890 | 3/1932 | Kennedy | 312—118 |
| 2,099,935 | 11/1937 | Kennedy | 312—118 |
| 2,241,696 | 5/1941 | Bender | 312—118 |
| 2,319,470 | 5/1943 | Nobles | 211—153 |
| 2,744,807 | 5/1956 | Bently | 211—153 X |
| 2,891,679 | 6/1959 | Maupin | 211—134 |
| 2,924,168 | 2/1960 | Jamentz | 211—153 X |

ROY D. FRAZIER, *Primary Examiner.*

CHANCELLOR E. HARRIS, *Examiner.*

W. D. LOULAN, *Assistant Examiner.*